(12) United States Patent
Tatsuno et al.

(10) Patent No.: US 7,506,717 B2
(45) Date of Patent: Mar. 24, 2009

(54) HYDRAULICALLY DRIVEN VEHICLE

(75) Inventors: Yukihiro Tatsuno, Tsukuba (JP); Kazuhiro Ichimura, Niihari-gun (JP); Hidetoshi Satake, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 396 days.

(21) Appl. No.: 10/540,857

(22) PCT Filed: Dec. 27, 2002

(86) PCT No.: PCT/JP02/13829

§ 371 (c)(1),
(2), (4) Date: Jun. 27, 2005

(87) PCT Pub. No.: WO2004/061337

PCT Pub. Date: Jul. 22, 2004

(65) Prior Publication Data
US 2006/0083622 A1   Apr. 20, 2006

(51) Int. Cl.
*F16D 31/02* (2006.01)
(52) U.S. Cl. .................. 180/307; 180/305; 180/54.1; 180/367; 180/291; 180/242; 180/6.48; 60/460; 60/420; 60/464; 60/441
(58) Field of Classification Search .............. 60/460, 60/459, 420, 464, 441; 180/307, 165, 305, 180/54.1, 367, 291, 242, 6.48
See application file for complete search history.

(56) References Cited

U.S. PATENT DOCUMENTS 3,864,911 A * 2/1975 Gellatly et al. ............ 60/430

5,159,813 A * 11/1992 Yoshimatsu et al. ........... 60/459

(Continued)

FOREIGN PATENT DOCUMENTS

EP    0 735 298 A2    10/1996

(Continued)

OTHER PUBLICATIONS

European Search Report dated Feb. 2, 2006 translated in English (Three (3) pages).

*Primary Examiner*—Christopher P Ellis
*Assistant Examiner*—Cynthia F Collado
(74) *Attorney, Agent, or Firm*—Crowell & Moring LLP

(57) ABSTRACT

The present invention includes a hydraulic pump (11), a variable displacement hydraulic motor (5) for traveling driven by pressure oil from the hydraulic pump (11), a motor displacement control means (17, 18) for adjusting a displacement of the hydraulic motor (5) in correspondence to a drive pressure at the hydraulic motor (5), an operating member (22) through which a forward travel command and a backward travel command for the vehicle are issued, a control means (12) to be driven in response to an operation of the operating member (22), for controlling a flow of pressure oil from the hydraulic pump (11) to the hydraulic motor (5), a reverse operation detection means (41A, 41B) for detecting a reverse operation of the operating member (22) performed to a reverse side opposite from a direction along which the vehicle is advancing, and a cavitation preventing means (25A,25B) engaged in operation so as to prevent occurrence of cavitation at the hydraulic motor (5) when the reverse operation at the operating member (22) is detected by the reverse operation detection means (41A, 41B).

15 Claims, 13 Drawing Sheets

U.S. PATENT DOCUMENTS

| | | | | |
|---|---|---|---|---|
| 5,664,477 | A * | 9/1997 | Koehler | 91/529 |
| 6,112,521 | A * | 9/2000 | Hayashi et al. | 60/460 |
| 6,159,308 | A * | 12/2000 | Uchida et al. | 148/302 |
| 6,209,675 | B1 | 4/2001 | Hayashi et al. | |
| 6,226,987 | B1 | 5/2001 | Hayashi et al. | |
| 7,210,292 | B2 * | 5/2007 | Price et al. | 60/426 |
| 7,281,376 | B2 * | 10/2007 | O'Brien, II | 60/493 |
| 7,334,403 | B2 * | 2/2008 | Markwart | 60/460 |
| 2008/0190103 | A1 * | 8/2008 | Behm | 60/460 |

FOREIGN PATENT DOCUMENTS

| | | |
|---|---|---|
| EP | 0 791 771 A1 | 8/1997 |
| GB | 2 395 769 A | 6/2004 |
| JP | 06-193731 | 7/1994 |
| JP | 7-47602 Y2 | 11/1995 |
| JP | 9-317879 A | 12/1997 |
| JP | 11-182674 A | 7/1999 |
| JP | 11-201278 A | 7/1999 |
| JP | 11-210880 | 8/1999 |

\* cited by examiner (a)

(b)

HYDRAULICALLY DRIVEN VEHICLE

TECHNICAL FIELD

The present invention relates to a hydraulically driven vehicle such as a wheel hydraulic excavator having a variable displacement traveling motor.

BACKGROUND ART

In a wheel hydraulic excavator having a variable displacement traveling motor in the related art, the motor displacement is controlled by driving a motor regulator in correspondence to the drive pressure at the traveling motor. In such a wheel hydraulic excavator, the motor displacement increases as the drive pressure rises to drive the motor at low speed with high torque and the motor displacement decreases as the drive pressure becomes lower to drive the motor at high speed with low torque.

More specifically, the motor displacement is fixed at a constant value (e.g., the minimum displacement) over a predetermined low motor drive pressure range so as to minimize the extent to which the traveling speed changes due to fluctuations in the motor drive pressure when traveling on flat ground or downhill, whereas the motor displacement is increased as the motor drive pressure increases beyond the predetermined range so as to increase the rotation torque at the motor during acceleration or when the vehicle is traveling uphill.

As either the front side (toward the toes) or the rear side (toward the heel) of the accelerator pedal in a wheel hydraulic excavator is depressed, the accelerator pedal is allowed to rotate along the forward/rearward direction. As the front side or the rear side of the accelerator pedal is depressed, the control valve is switched from the neutral position to a forward travel position or a reverse travel position, and pressure oil is supplied from a hydraulic pump to the traveling motor to generate a motor drive pressure. As the accelerator pedal is released while traveling, the control valve is switched to the neutral position, thereby cutting off the pressure oil supply from the hydraulic pump to the traveling motor. Subsequently, the vehicle travels with an inertial force and the function of the traveling motor is switched from the motor function to a pump function. The motor drive pressure decreases at this time and if the vehicle has been driven with a large motor displacement, the motor displacement is reduced, whereas if the vehicle has been driven with the minimum displacement, the minimum motor displacement is sustained. As a result, the quantity of oil intake required to rotate the traveling motor decreases to inhibit the occurrence of cavitation.

However, if a reverse operation is performed at the accelerator pedal while the vehicle is traveling, i.e., if the rear side of the accelerator pedal is depressed while the vehicle is traveling forward, the control valve is switched to the reverse travel position and, as a result, the motor drive pressure increases in a state in which the vehicle is traveling with an inertial force. Consequently, the motor displacement increases to lead to an increase in the quantity of oil intake required for traveling motor rotation, giving rise to the risk of cavitation.

DISCLOSURE OF THE INVENTION

An object of the present invention is to provide a hydraulically driven vehicle capable of preventing the occurrence of cavitaion when a reverse operation is performed at an accelerator pedal.

A hydraulically driven vehicle according to the present invention includes a hydraulic pump, a variable displacement hydraulic motor for traveling driven by pressure oil from the hydraulic pump, a motor displacement control means for adjusting a displacement of the hydraulic motor in correspondence to a drive pressure at the hydraulic motor, an operating member through which a forward travel command and a backward travel command for the vehicle are issued, a control means to be driven in response to an operation of the operating member, for controlling a flow of pressure oil from the hydraulic pump to the hydraulic motor, a reverse operation detection means for detecting a reverse operation of the operating member performed to a reverse side opposite from a direction along which the vehicle is advancing, and a cavitation preventing means engaged in operation so as to prevent occurrence of cavitation at the hydraulic motor when the reverse operation at the operating member is detected by the reverse operation detection means.

In this manner, the occurrence of cavitation can be prevented when an accelerator pedal is pressed in a direction opposite to a direction in which a vehicle is advancing.

The cavitation preventing means may be configured to inhibit an increase in the displacement of the hydraulic motor. It may be configured to block an operation signal from the operating member. It may also be configured to cut off the flow of pressure oil from the hydraulic pump to the hydraulic motor. The drive pressure may instead be reduced.

It is preferable to prevent occurrence of cavitation when the rotation speed of the hydraulic motor exceeds a reference value and the reverse operation at the operating member is detected. It is possible to prevent cavitation in accordance with a vehicle speed.

In this case, a reference value of the motor rotation speed may be set smaller as an inertial force applied to the vehicle becomes greater. A grade of a road surface or vehicle weight may be detected so as to detect the inertial force.

BEST MODE FOR CARRYING OUT THE INVENTION

First Embodiment

The following is an explanation of a first embodiment achieved by adopting the present invention in a wheel hydraulic excavator, given in reference to FIGS. 1 to 4.

Figure 1:
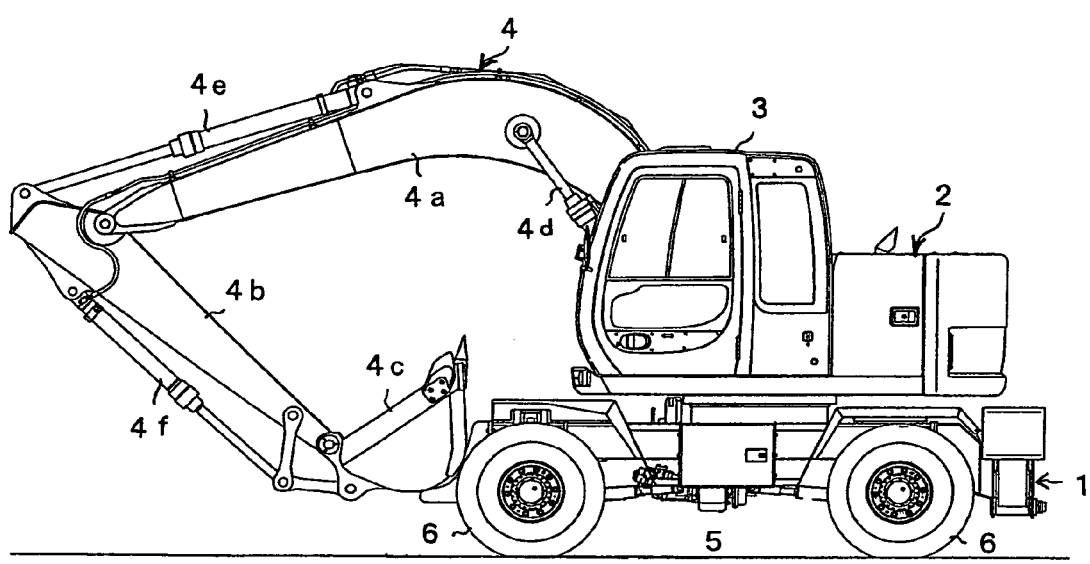
FIG. 1 presents an external view of a wheel hydraulic excavator in which the present invention is adopted.

As shown in FIG. 1, the wheel hydraulic excavator includes an undercarriage 1 and a revolving upperstructure 2 rotatably mounted atop the traveling superstructure 1. An operator's cab 3 and a work front attachment 4 constituted with a boom 4a, an arm 4b and a bucket 4c are disposed at the revolving upperstructure 2. The boom 4a is hoisted as a boom cylinder 4d is driven, the arm 4b is hoisted as an arm cylinder 4e is driven and the bucket 4c is engaged in a lift operation or a dump operation as a bucket cylinder 4f is driven. A variable displacement hydraulic traveling motor 5, which is hydraulically driven, is installed at the traveling superstructure 1.

Figure 2:
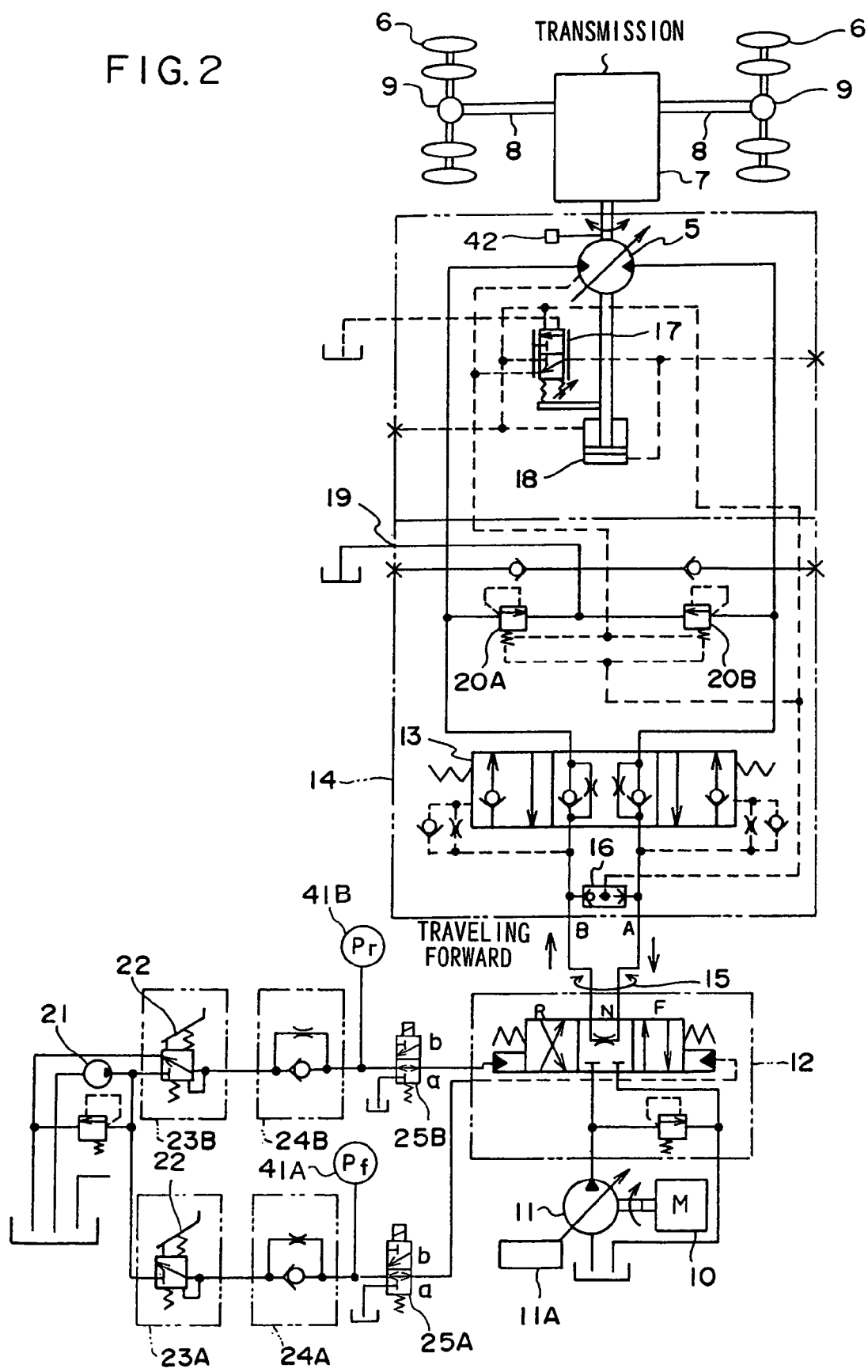
FIG. 2 is a circuit diagram of a traveling hydraulic circuit in the hydraulically driven vehicle achieved in a first embodiment.

FIG. 2 is a circuit diagram of a traveling hydraulic circuit in the wheel hydraulic excavator. As shown in FIG. 2, oil discharged from a variable displacement main pump 11 driven by an engine 10, the direction and the flow rate of which are controlled with a control valve 12, is supplied to a variable displacement traveling motor 5 via a brake valve 14 having a built-in counterbalance valve 13. The rotating speed of the traveling motor 5 is changed by a transmission 7 capable of changing the gear ratio over, for instance, two stages, i.e., low and high. Following the gear change, the rotation is transmitted to tires 6 via a drive shaft 8 and axles 9, thereby engaging the wheel hydraulic excavator in the traveling motion.

The displacement angle of the main pump 11 is adjusted with a pump regulator 11A. The pump regulator 11A includes a torque limiting unit to which the pump discharge pressure is fed back to enable horsepower control. The term "horsepower control" in this context refers to control of the pump displacement implemented so as to ensure that the load determined in correspondence to the pump discharge pressure and the pump displacement does not exceed the engine output. In addition, the regulator 11A includes a maximum displacement limiting unit that determines the maximum flow rate at the main pump 11.

The direction in which the control valve 12 is switched and the stroke quantity at the control valve 12 are controlled in conformance to a traveling pilot pressure supplied from a pilot circuit, and by adjusting the stroke quantity, the traveling speed of the vehicle can be controlled. The pilot circuit includes a pilot pump 21, a pair of traveling pilot valves 23A and 23B that generate a secondary pilot pressure as an accelerator pedal 22 is depressed, a pair of slow return valves 24A and 24B connected at a stage at the rear of the pilot valves 23A and 23B respectively to slow the oil returning to the pilot valves 23A and 23B and a pair of solenoid controlled directional control valves 25A and 25B that allow or prohibit generation of a traveling pilot pressure.

As the front side of the accelerator pedal 22 is depressed (front press operation) or the rear side of the accelerator pedal 22 is depressed (rear press operation), the accelerator pedal 22 is allowed to rotate along the forward direction or the rearward direction. In response to a front press operation at the accelerator pedal 22, the pilot valve 23A is driven, whereas the pilot valve 23B is driven in response to a rear press operation at the accelerator pedal 22. As the pilot valve 23A or 23B is driven, a pilot pressure achieving a level corresponding to the extent to which the accelerator pedal 22 has been operated is generated. This pilot pressure is detected at a pressure sensor 41A or 41B as an operation signal Pf or Pr from the accelerator pedal 22.

A governor of the engine 10 is connected to a pulse motor (not shown) and as the pulse motor rotates, the governor is driven. The rotation of the pulse motor is controlled in correspondence to the extent to which the accelerator pedal 22 is operated. Thus, as the accelerator pedal 22 is operated to a greater extent, the engine rotation speed increases, and as the accelerator pedal 22 is operated to a lesser extent, the engine rotation speed becomes lower. After the accelerator pedal 22 is released, the engine rotating rate shifts to an idling speed. It is to be noted that the engine may rotate at a constant rotation speed regardless of the extent to which the accelerator pedal 22 is operated.

The traveling motor 5 includes a device with automatic displacement control by drive pressure related and its displacement is increased as the drive pressure rises so as to drive it at low speed with high torque, whereas its displacement is decreased as the drive pressure becomes lower, so as to drive it at high speed with low torque. It is to be noted that the motor displacement remains unchanged even if the motor drive pressure fluctuates over a predetermined relatively low motor drive pressure range to sustain the minimum displacement, and that once the motor drive pressure increases to a level beyond the predetermined range, the motor displacement is increased in correspondence to the increase in the drive pressure. As a result, when the vehicle travels on flat ground or downhill with the motor drive pressure at a relatively low level, a change in the traveling speed due to fluctuations in the motor drive pressure is minimized, but high torque is achieved during acceleration or when the vehicle travels uphill with the motor drive pressure at a high level. The drive pressure is applied to a control piston 17 and a servo piston 18 of the traveling motor 5 from a shuttle valve 16 within the brake valve 14.

If a front step operation, for instance, is performed at the accelerator pedal 22 while the solenoid controlled directional control valves 25A and 25B are both at a position "a" as shown in the figure, the pilot pressure from the main pump 21 is applied to one of pilot ports at the control valve 12, and the control valve 12 is switched to an F position by the pilot pressure. With the control valve 12 thus switched, the oil discharged from the main pump 11 is guided to the traveling motor 5 via the control valve 12, a center joint 15 and the brake valve 14, and is also applied to the counterbalance valve 13 as a pilot pressure, thereby switching the counterbalance valve 13 from the neutral position. As a result, the traveling motor 5 is driven to engage the wheel hydraulic excavator in a forward traveling motion.

If the operation of the accelerator pedal 22 ceases in this state, the pressure oil from the pilot pump 21 is cut off by the pilot valve 23A and an outlet port comes into communication with a reservoir. As a result, the pressure oil having been applied to the pilot port at the control valve 12 is caused to return to the reservoir via the slow return valve 24A and the pilot valve 23A. Since the returning oil is compressed at a restrictor of the slow return valve 24A, the control valve 12 is gradually switched to the neutral position. Once the control valve 12 is switched to the neutral position, the oil discharged from the main pump 11 is allowed to return to the reservoir, the supply of the drive pressure oil to the traveling motor 5 is cut off and the counterbalance valve 13, too, is switched to the neutral position in the figure.

In this state, the vehicle body continues traveling with an inertial force and the traveling motor 5 switches from the motor function to a pump function, with a B port and an A port in the figure constituting the intake side and the outlet side respectively. Since the pressure oil from the traveling motor 5 is compressed at a restrictor (neutral restrictor) at the neutral position of the counterbalance valve 13, the pressure between the counterbalance valve 13 and the traveling motor 5 rises and works on the traveling motor 5 as a braking pressure. In response, a braking torque is generated at the traveling motor 5 to apply brakes on the vehicle body. In addition, since the drive pressure (the pressure on the B port side) at the traveling motor 5 decreases in this situation, the motor displacement becomes smaller unless the displacement of the motor 5 has already been at the minimum displacement level, and the minimum displacement is sustained if the motor displacement has already been at the minimum displacement level. Consequently, the quantity of oil intake needed to rotate the traveling motor 5, too, becomes smaller. If the quantity of oil intake becomes insufficient while the motor is functioning as a pump, supplementary oil is supplied to the traveling motor 5 from a makeup port 19. The maximum braking pressure is regulated with relief valves 20A and 20B. The returning oil at the relief valves 20A and 20B is guided to the intake side of the traveling motor 5.

In contrast, if a rear step operation (reverse operation) is performed at the accelerator pedal 22 while the vehicle is traveling in response to a front step operation at the accelerator pedal 22, the traveling motor 5 is driven with the inertial force of the vehicle body and the function of the traveling motor 5 switches from the motor function to the pump function in a manner similar to that described above. As the control valve 12 is switched to an R position in response to the reverse operation at the accelerator pedal 22, the drive pressure generated on the A port side by the main pump 11 switches the counterbalance valve 13 to the right side position in the figure, and the pressure in the A port-side pipeline is caused to rise drastically by the pressure oil discharged from the traveling motor 5 acting as a pump and the pressure oil discharged from the main pump 11. Thus, the pressure in the A port-side pipeline (motor drive pressure) increases in response to the reverse operation at the accelerator pedal 22, the high pressure oil is guided by the shuttle valve 16 to the pistons 17 and 18 to increase the motor displacement, and the quantity of oil intake needed to rotate the traveling motor 5, too, increases. This gives rise to a concern for the occurrence of cavitation due to insufficient oil supplement to the traveling motor 5. In order to prevent the occurrence of cavitation, the solenoid controlled directional control valves 25A and 25B are controlled in the embodiment as described below.

Figure 3:
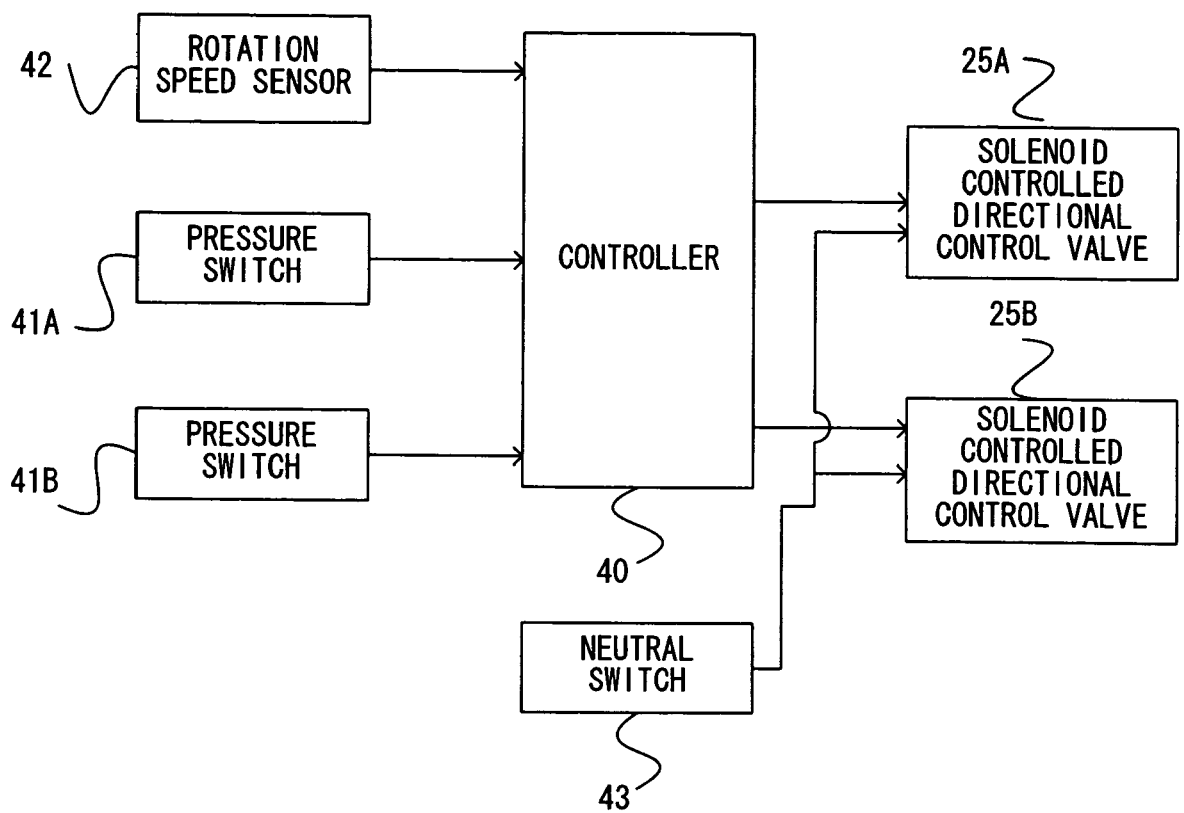
FIG. 3 is a block diagram of a control circuit that controls solenoid controlled directional control valves in FIG. 2.

FIG. 3 is a block diagram of a control circuit that controls the solenoid controlled directional control valves 25A and 25B. The pressure switches 41A and 41B and a rotation speed sensor 42 that detects the rotation speed of the traveling motor 5 are connected to the controller 40 constituted with a CPU and the like. Specific processing is executed in the controller 40 based upon signals input thereto from the pressure switches and the rotation speed sensor and the controller 40 then outputs control signals for the solenoid controlled directional control valves 25A and 25B. In addition, a neutral switch 43 is connected to the solenoid controlled directional control valves 25A and 25B. As the neutral switch 43 is turned on, the solenoid controlled directional control valves 25A and 25B are each switched to a "b" position, regardless of the control signal output from the controller 40.

Figure 4:
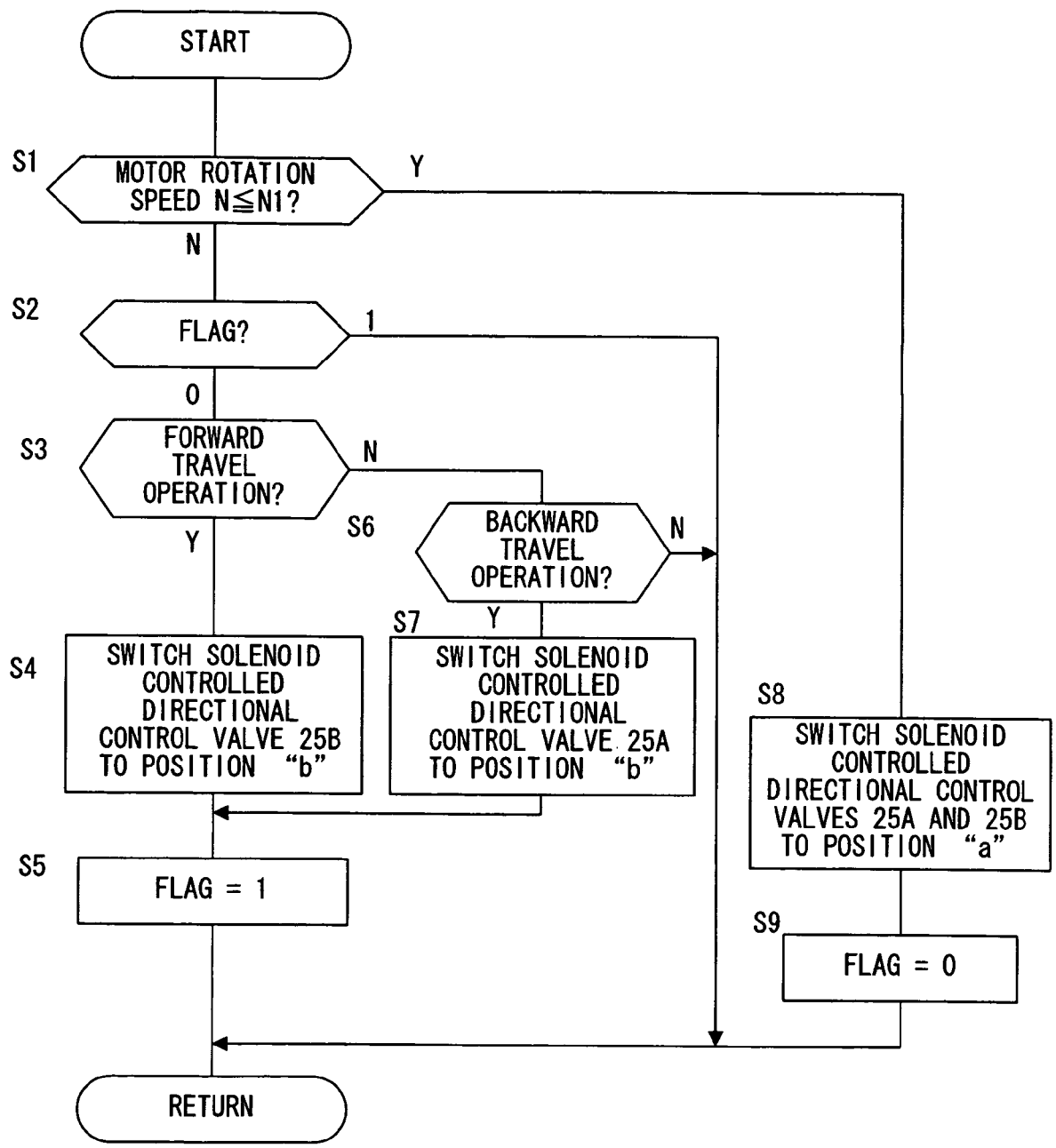
FIG. 4 presents a flowchart of an example of processing that may be executed in a controller shown in FIG. 3.

FIG. 4 presents a flowchart of an example of processing that may be executed in the controller 40. In step S1, a decision is made as to whether or not the rotation speed N of the traveling motor 5 detected with the rotation speed sensor 42 is equal to or lower than a predetermined reference rotation speed N1. This decision is made to judge the likelihood of cavitation. Namely, since the inertial force of the vehicle increases as the rotation speed of the traveling motor 5 becomes high, a larger quantity of oil needs to be taken into the traveling motor 5 following a reverse operation at the accelerator pedal 22, giving rise to an increased concern for cavitation. Accordingly, a rotation speed of the traveling motor 5 at which the concern for cavitation arises is set in advance as the reference rotation speed N1 (e.g., 1000 rpm) and the reference rotation speed N1 is compared with the actual rotation speed N in step S1.

If it is decided in step S1 that the motor rotation speed N is higher than the reference rotation speed N1, the operation proceeds to step S2 to ascertain a flag value. The flag is set to 0 in the initial state and is set to 1 once the motor rotation speed N exceeds the reference rotation speed N1. If it is decided in step S2 that the flag is set to 0, the operation proceeds to step S3, whereas the operation makes a return if the flag is determined to be set to 1. In step S3, a decision is made as to whether or not a front step operation has been performed at the accelerator pedal 22 based upon a signal provided by the pressure switch 41A. If an affirmative decision is made in step S3, the operation proceeds to step S4 to output a control signal to a solenoid of the solenoid controlled directional control valve 25B so as to switch the solenoid controlled directional control valve 25B to the position "b". Subsequently, the flag is set to 1 in step S5, before the operation makes a return.

If, on the other hand, a negative decision is made in step S3, the operation proceeds to step S6 to make a decision as to whether or not a rear step operation has been performed at the accelerator pedal 22 based upon a signal provided by the pressure switch 41B. If an affirmative decision is made in step S6, the operation proceeds to step S7, whereas the operation makes a return if a negative decision is made in step S6. In step S7, a control signal is output to a solenoid at the solenoid controlled directional control valve 25A to switch the solenoid controlled directional control valve 25A to the position "b", before the operation proceeds to step S5.

If it is decided in step S1 that the motor rotation speed N is equal to or lower than the reference rotation speed N1, the operation proceeds to step S8. In step S8, a control signal is output to the solenoids of both the solenoid controlled directional control valves 25A and 25B to switch the solenoid controlled directional control valves 25A and 25B to the position "a". Next, the flag is set to 0 in step S9, before the operation makes a return.

The operation that characterizes the first embodiment adopting the structure described above is now explained.

As the neutral switch 43 is turned on, the solenoid controlled directional control valves 25A and 25B are both switched to the position "b", thereby cutting off the supply of pilot pressure to the control valve 12. In this state, the pressure oil from the main pump 11 is not guided to the traveling motor 5 even if the accelerator pedal 22 is operated and the vehicle cannot travel along either the forward direction or the reverse direction.

As the neutral switch 43 is turned off, the solenoid controlled directional control valves 25A and 25B are switched in response to the control signal provided by the controller 40. If the vehicle is in a stationary state, the motor rotation speed N is 0, and accordingly, the solenoid controlled directional control valves 25A and 25B are switched to the position "a" and the flag is set to 0 (steps S8 and S9). If the transmission 7 is shifted to low or high and a front step operation is performed at the accelerator pedal 22 in this state, the control valve 12 is switched to the F position and the pressure oil from the main pump 11 is guided to the B port-side pipeline. Drive of the traveling motor 5 thus starts and the vehicle starts traveling forward.

When the rotation speed of the traveling motor 5 exceeds the reference rotation speed N1, the solenoid controlled directional control valve 25B is switched to the position "b" and the flag is set to 1 (steps S4 and S5). As a result, the pilot port at the control valve 12 comes into communication with the reservoir via the solenoid controlled directional control valve 25B. If a reverse operation (rear step operation) is performed at the accelerator pedal 22 in this state, the pressure oil from the pilot pump 21 becomes cut off by the solenoid controlled directional control valve 25B, stopping the supply of the pilot pressure to the control valve 12 and thus switching the control valve 12 to the N position. Subsequently, a braking pressure is generated in the A port-side pipeline with the counterbalance valve 13 in a manner similar to that with which a braking pressure is generated when an operation of the accelerator pedal 22 ceases, and while the vehicle travels forward with an inertial force, a hydraulic braking force is applied so that the motor rotation speed slows down. As a result, the motor drive pressure becomes reduced as in a normal deceleration operation, the drive pressure guided to the pistons 17 and 18 from the shuttle valve 16 is reduced and thus, the motor displacement is not allowed to increase. Consequently, the extent to which the quantity of the required oil intake at the motor increases is minimized and the occurrence of cavitation is prevented. This state is sustained until the motor rotation speed N becomes equal to or lower than the reference rotation speed N1.

Once the motor rotation speed becomes equal to or lower than the reference rotation speed N1, the solenoid controlled directional control valves 25A and 25B are each switched to the position "a" (step S8). Consequently, the pilot pressure is applied to the control valve 12, switching the control valve 12 to the R position to guide the pressure oil from the main pump 11 into the A port-side pipeline. This results in an increase in the drive pressure guided to the pistons 17 and 18, which, in turn, increases the motor displacement. While the motor displacement increases in response to the reverse operation at the accelerator pedal 22 in this situation, the motor rotation speed N is low and for this reason, the traveling motor 5 does not require a large quantity of oil intake and any shortage in the quantity of oil intake can be fully supplemented with the oil supplied from the makeup port 19.

By allowing the motor displacement to increase in response to the reverse operation at the accelerator pedal 22 when the motor rotation speed is equal to or lower than the reference rotation speed N1 as described above, it becomes possible to engage the traveling motor 5 in reverse rotation with a high torque immediately after stopping the traveling motor 5. The vehicle traveling direction can be switched more efficiently by allowing a motor displacement increase in this manner rather than by performing a rear step operation at the accelerator pedal 22 after stopping the traveling motor 5.

It is to be noted that the motor displacement undergoes a similar change if a reverse or opposite operation (front step operation) is performed at the accelerator pedal 2 while the vehicle is traveling in response to a rear step operation at the accelerator pedal 22.

As described above, the traveling pilot circuit achieved in the first embodiment includes the solenoid controlled directional control valves 25A and 25B and if the rotation speed of the traveling motor 5 is greater than the reference rotation speed N1, generation of a traveling pilot pressure in response to a reverse operation at the accelerator pedal 22 is prohibited. As a result, the control valve 12 is switched to the neutral position, preventing an increase in the motor displacement and thus preventing the occurrence of cavitation. In addition, when the rotation speed of the traveling motor 5 is equal to or lower than the reference rotation speed N1, the generation of the traveling pilot pressure in response to a reverse operation at the accelerator pedal 22 is allowed and thus, the forward and reverse traveling directions can be switched efficiently at low speed. As the solenoid controlled directional control valves 25A and 25B are installed in the traveling pilot circuit, they only need to be capable of withstanding low pressure and the hydraulic circuit can be provided at low cost. Since the control valve 12 is switched to the neutral position in response to a reverse operation at the accelerator pedal 22, the oil discharged from the main pump 11 is not guided to the drive circuit for the traveling motor 5 and for this reason, no unnecessary load is applied to the pump 11. Since the neutral switch 43 that issues a command for a neutral traveling state is included and the neutral state command overrides the control by the controller 40 so as to disable switching of the solenoid controlled directional control valves 25A and 25B, a stable neutral traveling state can be sustained.

Second Embodiment

Figure 5:
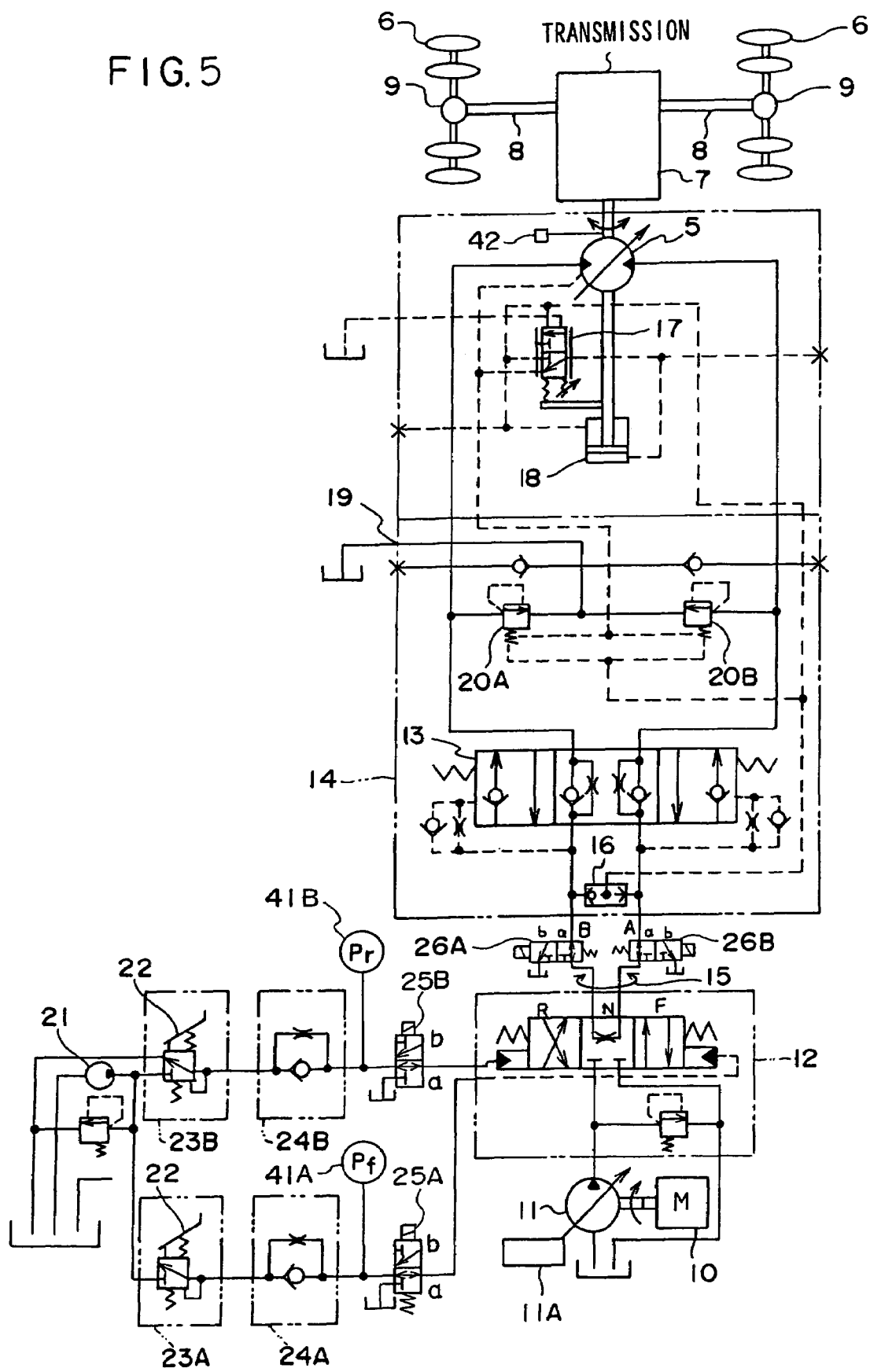
FIG. 5 is a circuit diagram of a traveling hydraulic circuit in the hydraulically driven vehicle achieved in a second embodiment.

A second embodiment of the present invention is now explained in reference to FIG. 5.

FIG. 5 is a circuit diagram of a traveling hydraulic circuit in the wheel hydraulic excavator achieved in the second embodiment. It is to be noted that the same reference numerals are assigned to components identical to those in FIG. 2 and the following explanation focuses on the differentiating features.

While a pair of solenoid controlled directional control valves 25A and 25B are installed in the traveling pilot circuit in the first embodiment, the second embodiment further includes a pair of solenoid controlled directional control valves 26A and 26B disposed between the control valve 12 and the brake valve 14. By switching the solenoid controlled directional control valves 26A and 26B as described later, the flow of pressure oil from the main pump 11 to the brake valve 14 is either allowed or disallowed while generation of a traveling pilot pressure itself is allowed, unlike in the first embodiment.

The solenoid controlled directional control valves 25A and 25B are not connected to the controller 40 but are connected to the neutral switch 43 alone to be switched in response to an operation of the neutral switch 43. Namely, the solenoid controlled directional control valves 25A and 25B are each switched to the position "b" in response to an ON operation at the neutral switch 43 and are each switched to the position "a" in response to an OFF operation at the neutral switch.

The solenoid controlled directional control valves 26A and 26B are switched in a manner similar to that explained in reference to the first embodiment, through the processing executed in the controller 40. Namely, the solenoid controlled directional control valve 26B is switched to the position "b" once the motor rotation speed N exceeds the reference rotation speed N1 in response to a front step operation at the accelerator pedal 22, and the solenoid controlled directional control valve 26A is switched to the position "b" as the motor rotation speed N exceeds the reference rotation speed N1 in response to a rear step operation at the accelerator pedal 22. As the motor rotation speed N becomes equal to or lower than the reference rotation speed N1 following a reverse operation at the accelerator pedal 22, the solenoid controlled directional control valves 26A and 26B are individually switched to the position "a".

In the second embodiment, as a reverse operation is performed at the accelerator pedal 22 by depressing on the rear side after the motor rotation speed N exceeds the reference rotation speed N1 in response to a front step operation at the accelerator pedal 22, the pilot pressure is applied to the control valve 12, switching the control valve from the position F to the position R. Since the solenoid controlled directional control valve 26B is switched to the position "b" at this point, the pressure oil from the main pump 11 is not supplied to the brake valve 14, allowing the counterbalance valve 13 to remain at the neutral position, and the motor drive pressure becomes lowered as in a normal deceleration operation, as explained earlier. As a result, the increase in the motor displacement is minimized to prevent the occurrence of cavitation.

As the motor rotation speed N becomes equal to or lower than the reference rotation speed N1 following a reverse operation at the accelerator pedal 22, the solenoid controlled directional control valves 26A and 26B are switched to the position "a" and the pressure oil from the main pump 11 is guided to the brake valve 14. As a result, the motor drive pressure increases and the motor displacement, too, increases. Since the motor rotation speed N is low in this situation, the concern for the occurrence of cavitation does not arise and the forward traveling direction and the reverse traveling direction can be switched efficiently.

As described above, in the second embodiment, having the solenoid controlled directional control valves 26A and 26B disposed between the control valve 12 and the brake valve 14, when the rotation speed of the traveling motor 5 is higher than the reference rotation speed N1, the supply of pressure oil to the brake valve 14 in response to a reverse operation at the accelerator pedal 22 is prohibited and when the traveling motor rotation speed is equal to or lower than the allowable reference rotation speed N1, the pressure oil supply is allowed. As a result, the occurrence of cavitation can be prevented with a high degree of effectiveness.

Third Embodiment

Figure 6:
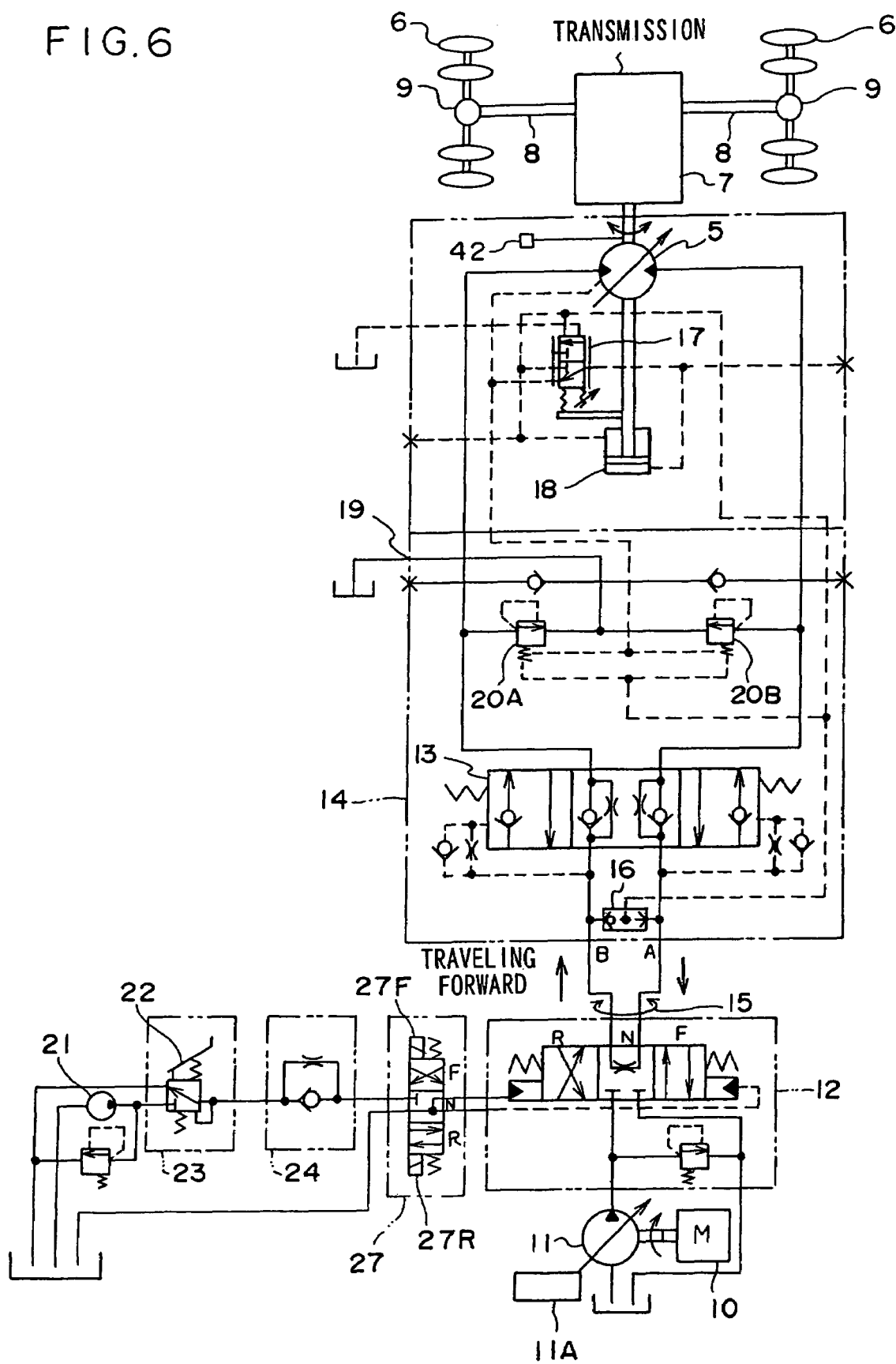
FIG. 6 is a circuit diagram of a traveling hydraulic circuit in the hydraulically driven vehicle achieved in a third embodiment.
Figure 7:
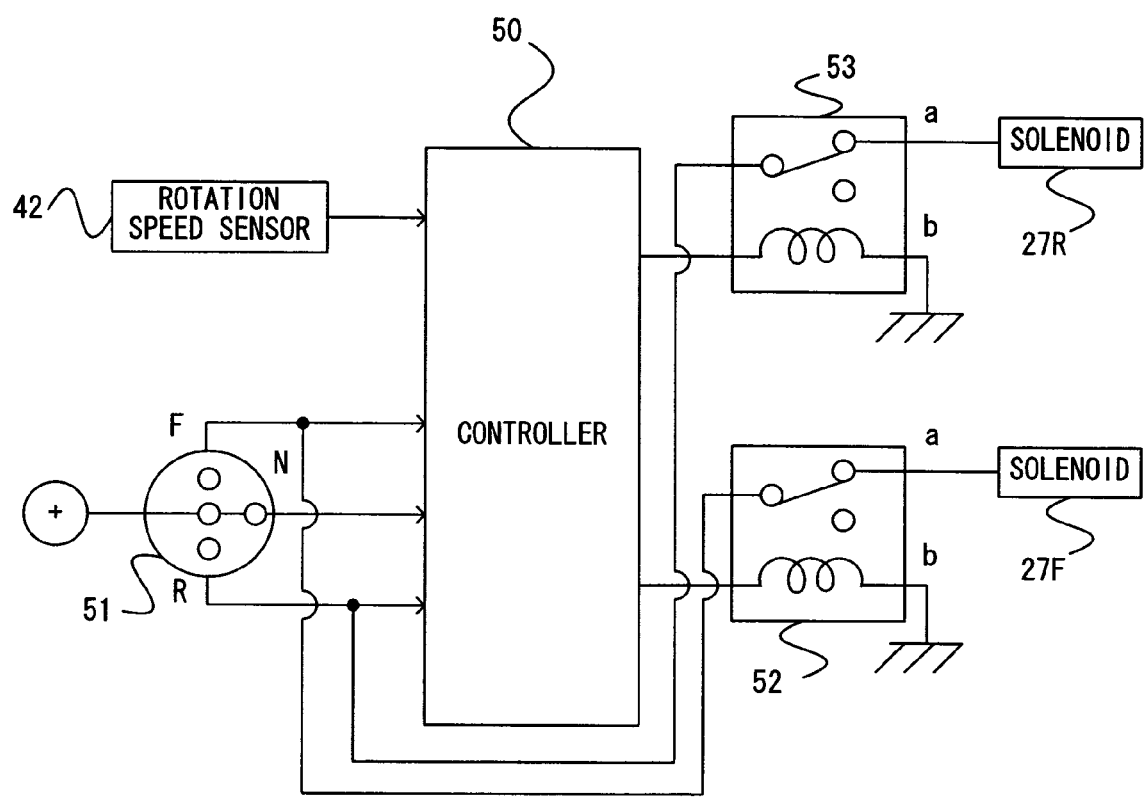
FIG. 7 is a block diagram of a control circuit that controls a forward/backward switching valve in FIG. 6.
Figure 8:
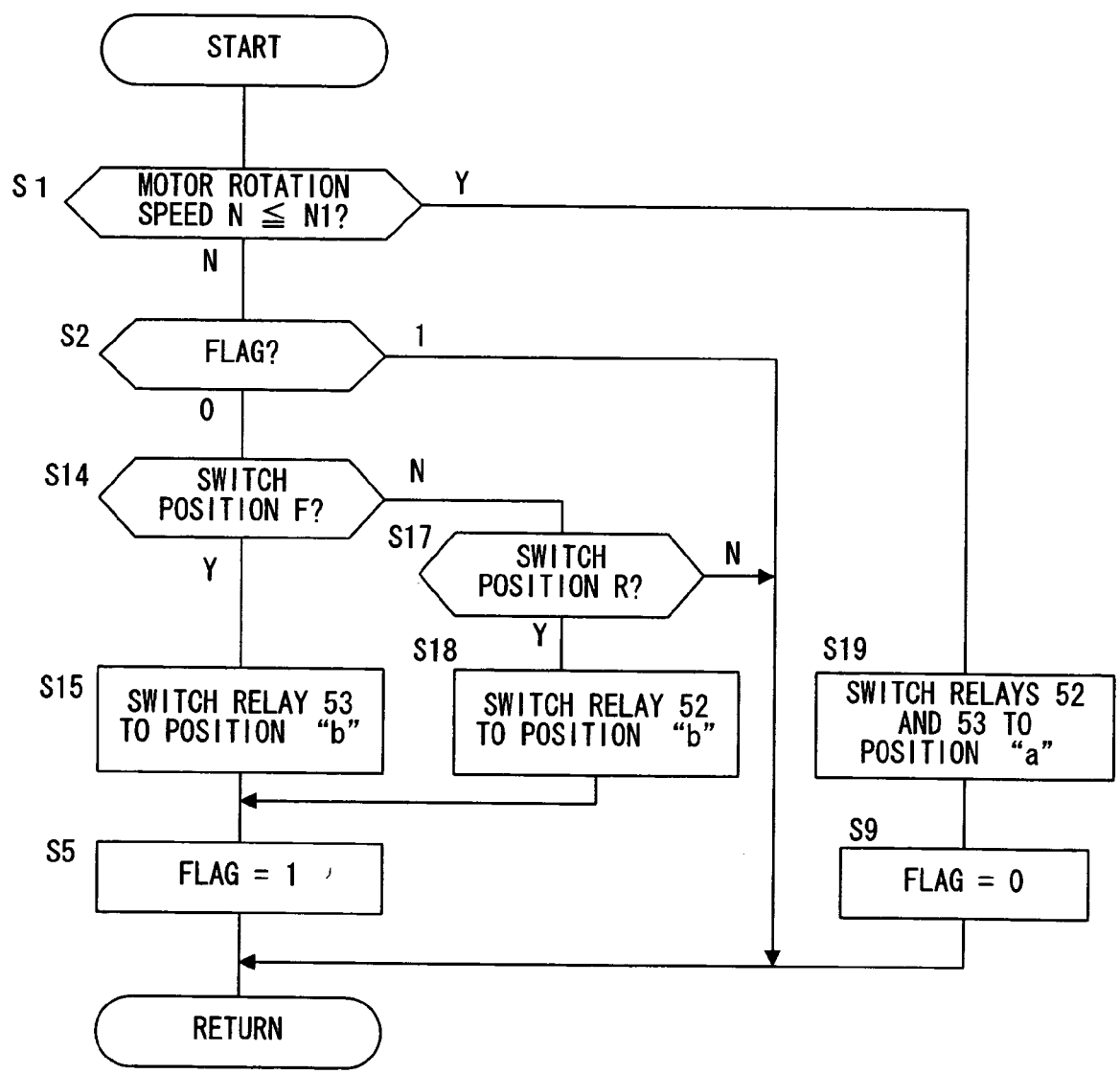
FIG. 8 presents a flowchart of an example of processing that may be executed in a controller shown in FIG. 7.

A third embodiment of the present invention is now explained in reference to FIGS. 6 through 8.

FIG. 6 is a circuit diagram of a traveling hydraulic circuit in the wheel hydraulic excavator achieved in the third embodiment. It is to be noted that the same reference numerals are assigned to components identical to those in FIG. 2 and the following explanation focuses on the differentiating features.

A traveling pilot circuit in the third embodiment differentiates it from the first embodiment. Namely, while a pair of pilot valves 23A and 23B and a pair of slow return valves 24A and 24B are provided and the pilot valves 23A and 23B are individually driven in response to a front step operation and a rear step operation performed at the accelerator pedal 22 in the first embodiment, a single pilot valve 23 and a single slow return valve 24 are utilized and the pilot valve 23 is driven in response to an operation at the accelerator pedal 22 in the third embodiment.

A forward/backward switching valve 27 is connected next to the slow return valve 24. As a solenoid 27F of the forward/backward switching valve 27 is excited, the forward/backward switching valve 27 is switched to a position F, as a solenoid 27R of the forward/backward switching valve 27 is excited, the forward/backward switching valve 27 is switched to a position R, and as the solenoids 27F and 27R become demagnetized, the forward/backward switching valve is switched to a position N. If the forward/backward switching valve 27 is switched to the position F or the position R while the accelerator pedal 22 is being depressed, a pilot pressure is applied to a pilot port at the control valve 22, thereby switching the control valve 12 to the F position or the R position. If the forward/backward switching valve 27 is switched to the position N, no pilot pressure is applied to the control valve 12 and the control valve 12 is switched to the N position.

FIG. 7 is a block diagram of the control circuit that controls the forward/backward switching valve 27. It is to be noted that the same reference numerals are assigned to components identical to those in FIG. 3. The rotation speed sensor 42 and a forward/backward selector switch 51 are connected to a controller 50. The forward/backward selector switch 51 is installed in the operator's cab 3, and can be operated to an F position, an N position or an R position to output a command for the vehicle to travel forward, to travel backward or to assume a neutral state. An F contact point of the forward/backward selector switch is connected to the solenoid 27F of the forward/backward switching valve 27 via a relay 52, whereas an R contact point of the forward/backward selector switch is connected to the solenoid 27 R via a relay 53. The controller 50 executes processing described below and outputs a control signal to coils at the relays 52 and 53.

FIG. 8 presents a flowchart of an example of processing that may be executed in the controller 50. It is to be noted that the same step numbers are assigned to steps identical to those in FIG. 4 and the following explanation focuses on the differentiating features. After deciding in step S2 that the flag is set to 0, the operation proceeds to step S14 to make a decision as to whether or not the forward/backward selector switch 51 is currently set to the F position. If an affirmative decision is made in step S14, the operation proceeds to step S15 to supply power to the coil at the relay 53. In response, the relay 53 is switched to a contact point "b", thereby preventing the solenoid 27R from becoming excited. If, on the other hand, a negative decision is made in step S14, the operation proceeds to step S17 to make a decision as to whether or not the forward/backward selector switch 51 is currently set to the R position. If an affirmative decision is made in step S17, the operation proceeds to step S18 to supply power to the coil at the relay 52. In response, the relay 52 is switched to a contact point "b" and the solenoid 27F is thus prevented from becoming excited. If the switch 51 is at the N position, a negative decision is made in step S17 and the operation makes a return.

The operation proceeds to step S19 after making a decision in step S1 that the motor rotation speed N is equal to or lower than the reference rotation speed N1. In step S19, the power supply to the coils at the relays 52 and 53 is stopped. In response, the relays 52 and 53 are both switched to the contact points "a".

If the forward/backward selector switch 51 is operated to the F position while the vehicle is, for instance, in a stationary state and the accelerator pedal 22 is depressed in the third embodiment described above, the relays 52 and 53 are switched to the position "a" and the solenoid 27F becomes excited (step S19). As a result, the forward/backward switching valve 27 is switched to the position F, the pilot pressure is applied to the control valve 12 and the control valve 12, in turn, is switched to the F position. With the control valve thus switched, the pressure oil from the main pump 11 is guided to the traveling motor 5 and the vehicle starts traveling forward.

Once the rotation speed of the traveling motor 5 exceeds the reference rotation speed N1, the relay 53 is switched to the position "b" and the power supply to the solenoid 27 R stops (step S15). In this state, the solenoid 27R does not become excited even if the forward/backward selector switch 51 is operated to the R position, i.e., even if a reverse operation is performed at the switch 51, and the forward/backward switching valve 27 is switched to the position N. The generation of a traveling pilot pressure is thus prevented, the control valve 12 is switched to the neutral position and the counterbalance valve 13, too, is switched to the neutral position, resulting in a reduction in the motor drive pressure due to the normal braking function, which disallows an increase in the motor displacement.

As explained earlier, once the rotation speed of the traveling motor 5 becomes equal to or lower than the reference rotation speed N1 after the forward/backward selector switch 51 is operated to the R position, the relay 53 is switched to the position "a" and the solenoid 27R becomes excited (step S19). In response, the forward/backward switching valve 27 is switched to the position R and the control valve 12 is also switched to the position R. As a result, the motor drive pressure increases to increase the motor displacement. However, since the motor rotation speed N is low, cavitation does not occur.

As described above, the traveling pilot circuit in the third embodiment includes the forward/backward switching valve 27 that can be switched through a switching operation and when the rotation speed of the traveling motor 5 is higher than the reference rotation speed N1, a changeover at the forward/backward switching valve 27 in response to a reverse operation at the switch 51 is prohibited so as to prevent the generation of a traveling pilot pressure. Consequently, since the motor displacement is not allowed to increase, the occurrence of cavitation is prevented.

Fourth Embodiment

Figure 9:
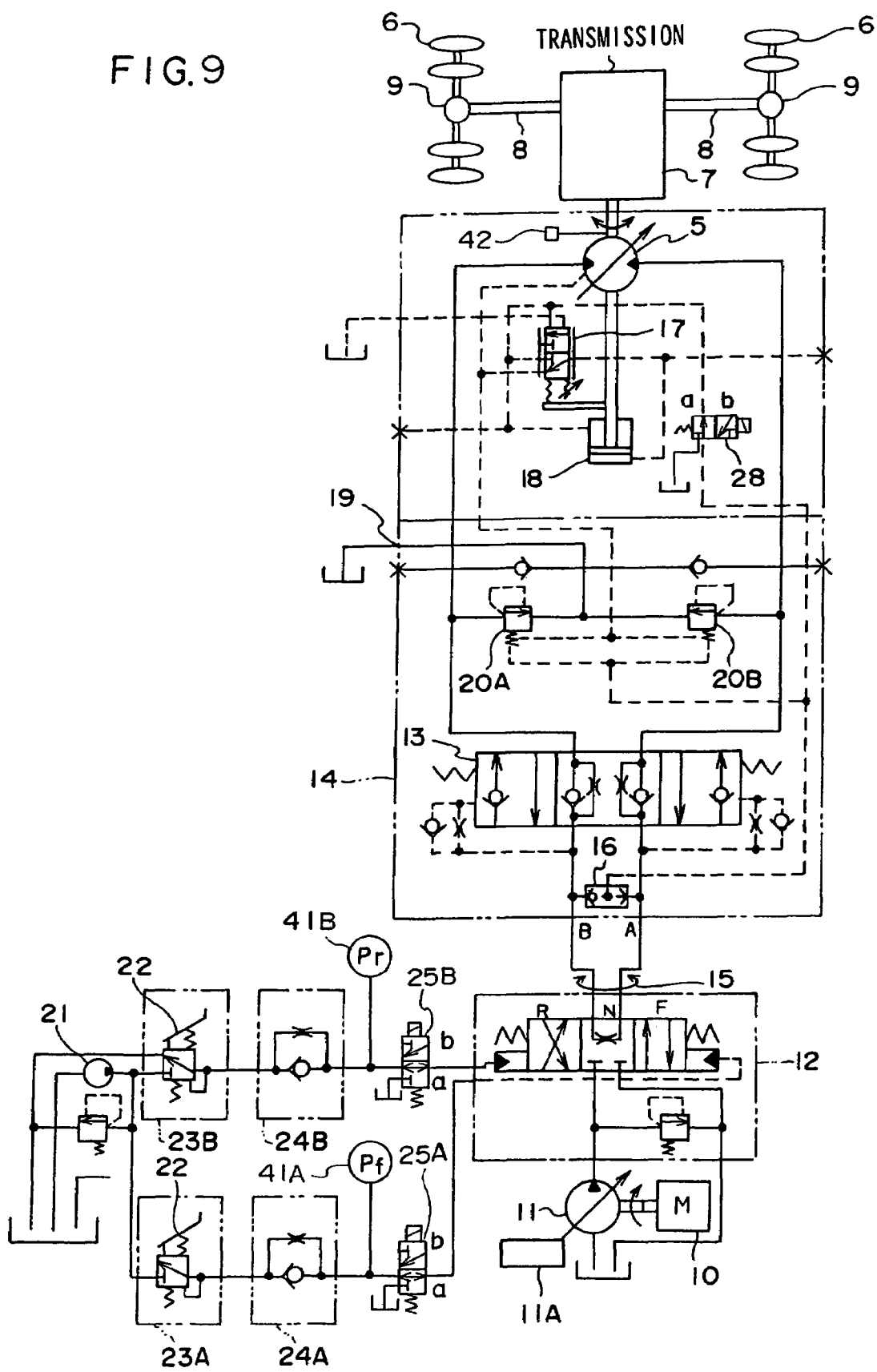
FIG. 9 is a circuit diagram of a traveling hydraulic circuit in the hydraulically driven vehicle achieved in a fourth embodiment.
Figure 10:
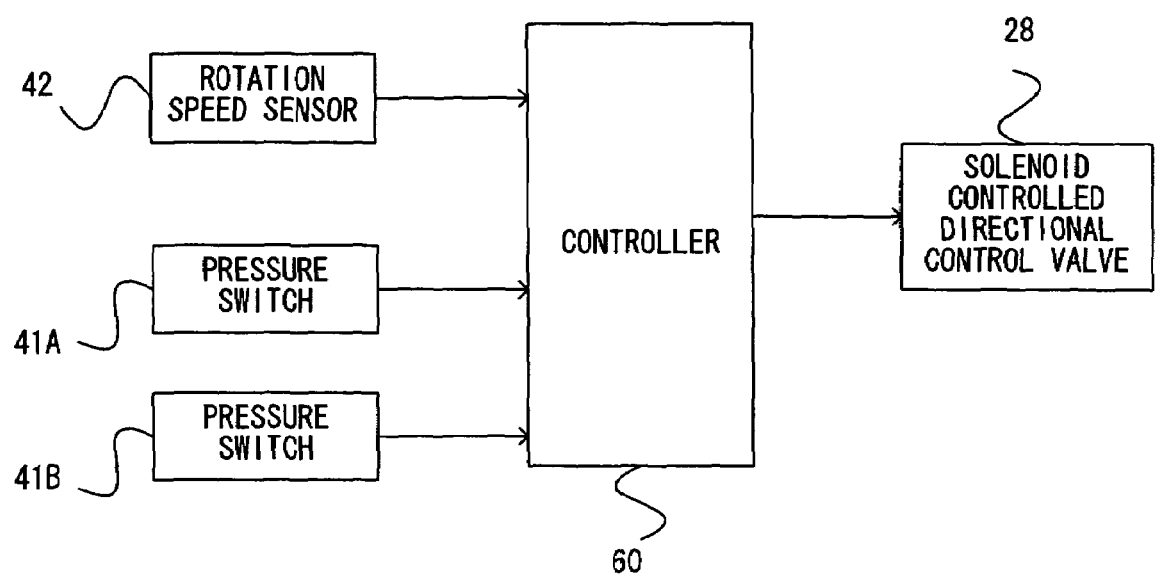
FIG. 10 is a block diagram of a control circuit that controls a solenoid controlled directional control valve in FIG. 9.
Figure 11:
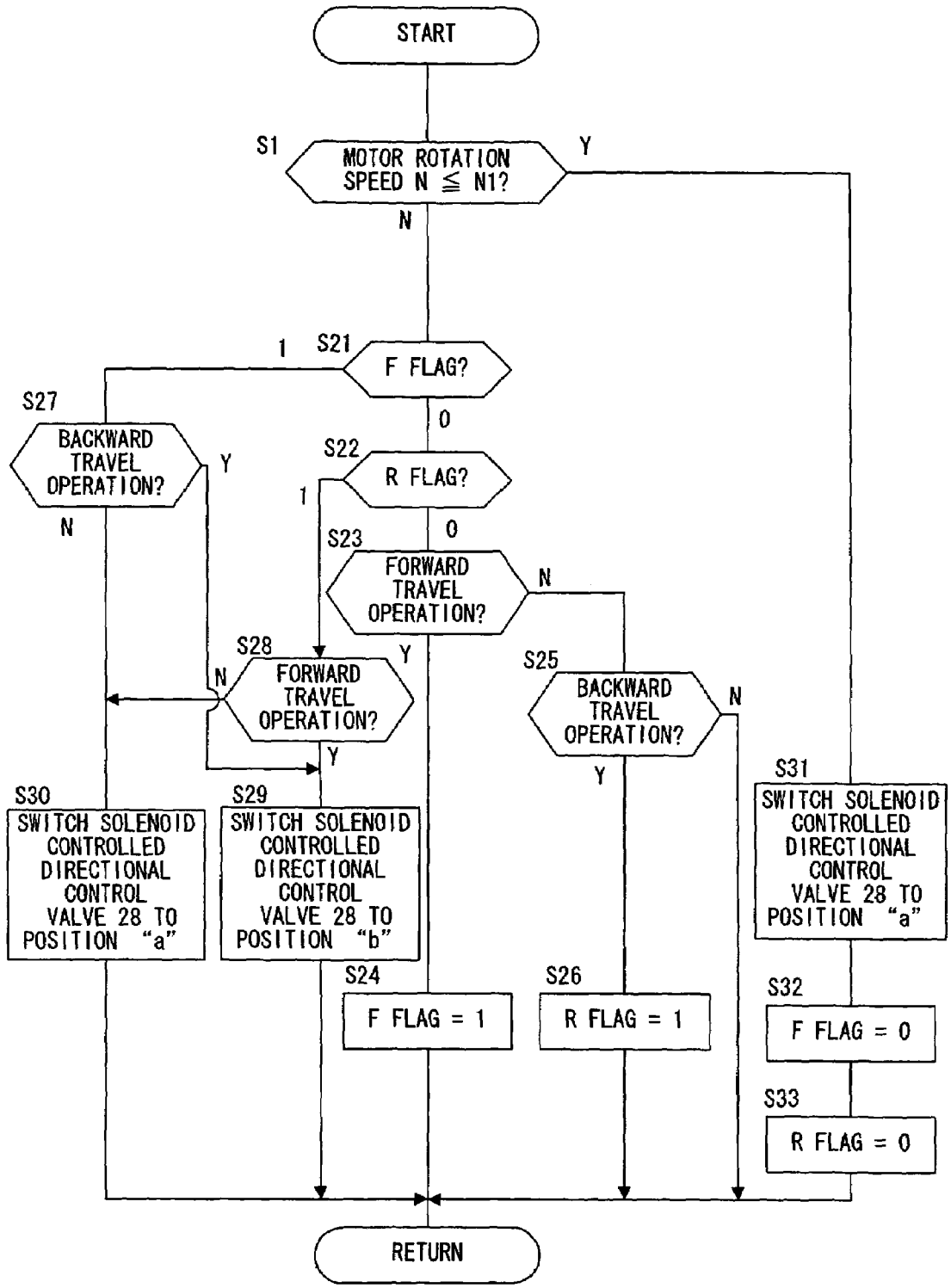
FIG. 11 presents a flowchart of an example of processing that may be executed in a controller shown in FIG. 10.

A fourth embodiment of the present invention is now explained in reference to FIGS. 9 through 11.

FIG. 9 is a circuit diagram of a traveling hydraulic circuit in the wheel hydraulic excavator achieved in the fourth embodiment. It is to be noted that the same reference numerals are assigned to components identical to those in FIG. 2 and the following explanation focuses on the differentiating features.

While a pair of solenoid controlled directional control valves 25A and 25B are installed in the traveling pilot pipeline in the first embodiment, the fourth embodiment further includes an solenoid controlled directional control valve 28 installed in a drive pressure supplied pipeline extending from the shuttle valve 16 to the control piston 17 and the servo piston 18. As shown in FIG. 9, as the solenoid controlled directional control valve 28 is switched to the position "a", a drive pressure is guided to the pistons 17 and 18, and the motor displacement assumes a value corresponding to the drive pressure. As the solenoid controlled directional control valve 28 is switched to a position "b", the supply of drive pressure from the shuttle valve 16 to the pistons 17 and 18 stops, thereby setting the motor displacement to the minimum value. It is to be noted that the solenoid controlled directional control valves 25A and 25B are not connected to a controller 60 and are switched in response to an operation of the neutral switch 43 as in the second embodiment.

FIG. 10 is a block diagram of a control circuit that controls the solenoid controlled directional control valve 28. It is to be noted that the same reference numerals are assigned to components identical to those in FIG. 3. The rotation speed sensor 42 and the pressure switches 41A and 41B are connected to the controller 60. The controller 60 executes the following processing in response to signals input thereto from the rotation speed sensor and the pressure switches and outputs a control signal to a solenoid at the solenoid controlled directional control valve 28.

FIG. 11 presents a flowchart of an example of processing that may be executed in the controller 60. It is to be noted that the same step numbers are assigned to steps identical to those in FIG. 4, and the following explanation focuses on the differentiating features. The operation proceeds to step S21 after making a negative decision in step S1, and the value of an F flag is ascertained in step S21. The F flag is set to 1 (step S24) if the motor rotation speed exceeds the reference rotation speed N1 following a front step operation at the accelerator pedal 22. If the value of the F flag is judged to be 0 in step S21, the operation proceeds to step S22 to ascertain the value of an R flag. The R flag is set to 1 (step S26) if the motor rotation speed exceeds the reference rotation speed N1 following a rear step operation at the accelerator pedal 22. If the value of the R flag is judged to be 0 in step S22, the operation proceeds to step S23.

In step S23, a decision is made based upon a signal provided from the pressure switch 41A as to whether or not a front step operation has been performed at the accelerator pedal 22. If an affirmative decision is made in step S23, the operation proceeds to step S24 to set the F flag to 1, before the operation makes a return. If a negative decision is made in step S23, the operation proceeds to step S25 to make a decision based upon a signal provided from the pressure switch 41B as to whether or not a rear step operation has been performed at the accelerator pedal 22. The operation proceeds to step S26 if an affirmative decision is made in step S25, whereas the operation makes a return if a negative decision is made in step S25. In step S26, the R flag is set to 1, and then the operation makes a return.

If it is decided in step S21 that the F flag is set to 1, the operation proceeds to step S27 to make a decision based upon a signal provided from the pressures witch 41B as to whether or not a rear step operation has been performed at the accelerator pedal 22. If an affirmative decision is made in step S27, the operation proceeds to step S29 to output a control signal to the solenoid at the solenoid controlled directional control valve 28 and switch the solenoid controlled directional control valve 28 to the position "b". If a negative decision is made in step S27, the operation proceeds to step S30 to output a control signal to the solenoid at the solenoid controlled directional control valve 28 and switch the solenoid controlled directional control valve 28 to the position "a".

If, on the other hand, it is decided in step S22 that the R flag is set to 1, the operation proceeds to step S28 to make a decision based upon a signal provided from the pressure switch 41A as to whether or not a front step operation has been performed at the accelerator pedal 22. The operation proceeds to step S29 if an affirmative decision is made in step S28, whereas the operation proceeds to step S30 if a negative decision is made in step S28.

If it is decided in step S1 that the motor rotation speed N is equal to or lower than the reference rotation speed N1, the operation proceeds to step S31. In step S31, a control signal is output to the solenoid at the solenoid controlled directional control valve 28, thereby switching the solenoid controlled directional control valve 28 to the position "a". Then, the F flag is set to 0 in step S32 and the R flag is set to 0 in step S33.

If a front step operation, for instance, is performed at the accelerator pedal 22 in the fourth embodiment adopting the structure described above, the control valve 12 is switched to the F position and the pressure oil from the main pump 11 causes the traveling motor 5 to rotate. At this time, the solenoid controlled directional control valve 28 is switched to the position "a" through the processing explained earlier (step S31), the drive pressure is guided to the pistons 17 and 18, and the motor displacement achieves a value corresponding to the drive pressure.

While the F flag is set to 1 (step S24) once the motor rotation speed exceeds the reference rotation speed N1, the solenoid controlled directional control valve 28 remains at the position "a" (step S30) as long as a reverse operation is not performed at the accelerator pedal 22. If a reverse operation is performed at the accelerator pedal 22 in this state, the solenoid controlled directional control valve 28 is switched to the position "b" (step S29). The supply of the drive pressure to the pistons 17 and 18 is thus cut off, and as the motor displacement is set to the minimum value, the occurrence of cavitation is prevented.

If the motor rotation speed becomes equal to or lower than the reference rotation speed N1 following a reverse operation at the accelerator pedal 22, the solenoid controlled directional control valve 28 is switched to the position "a" (step S31). In response, the drive pressure is supplied to the pistons 17 and 18, which increases the motor displacement.

As described above, in the fourth embodiment which includes the solenoid controlled directional control valve 28 installed in the drive pressure supply pipeline extending from the shuttle valve 16 to the pistons 17 and 18, an increase in the motor displacement is disallowed by prohibiting the supply of the drive pressure to the pistons 17 and 18 if a reverse operation is performed at the accelerator pedal 22 in a state where the rotation speed of the traveling motor 5 is higher than the reference rotation speed N1. As a result, the occurrence of cavitation can be prevented.

It is to be noted that while an increase in the motor displacement is allowed or prohibited in correspondence to the rotation speed of the traveling motor 5 in the explanation given above, the inertial force of the vehicle also has a correlation with the grade of the road surface and the vehicle weight as well as the motor rotation speed. Accordingly, it is desirable to set the reference rotation speed N1 by taking these factors into consideration as well in order to reliably prevent the occurrence of cavitation.

Figure 12:
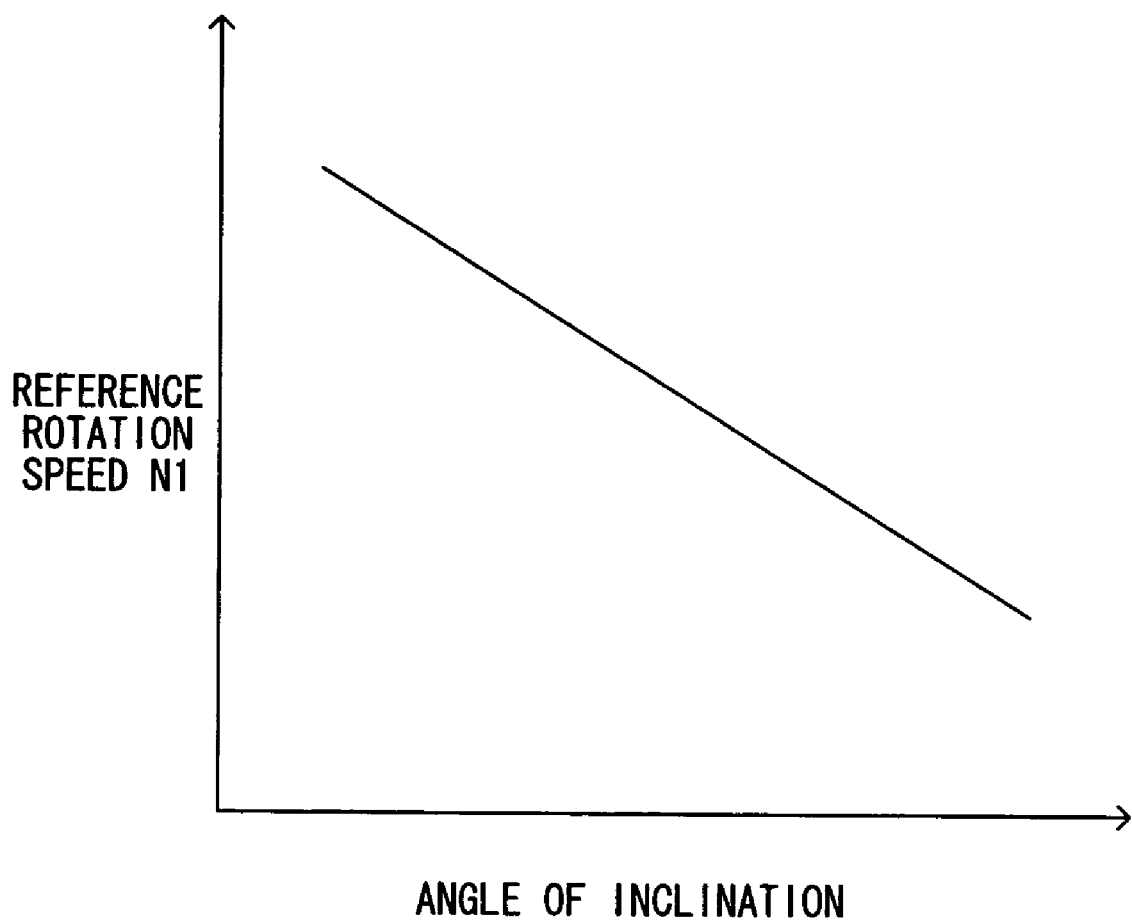
FIG. 12 shows an example of the reference rotation speed setting that may be adopted when switching the solenoid controlled directional control valve.

When the grade of the road surface is to be taken into consideration, an inclination sensor, for instance, may be mounted at the vehicle to detect the grade of the road surface and the reference rotation speed N1 should be set to a smaller value as the angle of inclination becomes larger, i.e., as the inertial force increases as shown in FIG. 12.

Figure 13:
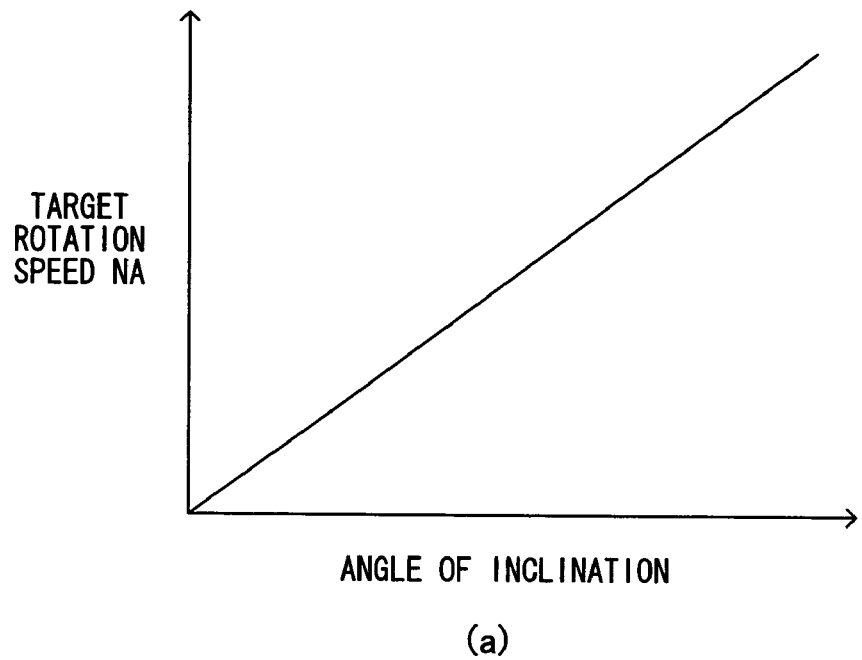
FIG. 13 shows another example of the reference rotation speed setting that may be adopted when switching the solenoid controlled directional control valve.
Figure 13:
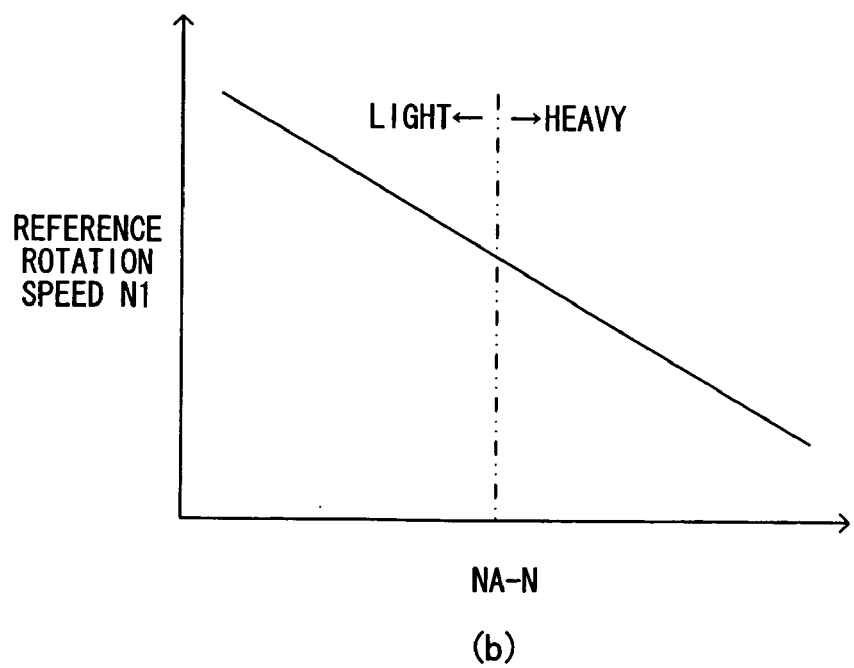

When the vehicle weight is to be taken into consideration, a target rotation speed NA for the traveling motor 5 corresponding to the angle of inclination of a downhill slope should be calculated based upon a predetermined relationship such as that shown in FIG. 13(a). Then, based upon a relationship such as that shown in FIG. 13(b), the vehicle weight is judged to be greater as the difference between the target rotation speed NA and the actual rotation speed N becomes greater and the reference rotation speed N1 should be set to a smaller value for a heavier vehicle.

Instead of detecting the rotation speed of the traveling motor 5, a physical quantity having a correlation to the motor rotation speed may be detected. For instance, the rotation speed of the output shaft of the transmission 7 may be detected and the solenoid controlled directional control valves 25A, 25B, 26A, 26B and 28 and the relays 52 and 56 may be switched depending upon whether or not the detected value exceeds a reference rotation speed N1. In this case, the reference rotation speed N1 for the output shaft should be set in correspondence to the gear ratio at the transmission. Namely, the reference rotation speed should be set to a smaller value when the gear is shifted to low (the gear ratio is large) compared to when the gear is shifted to high (the gear ratio is small).

While a forward travel command or a reverse travel command is issued through a front step operation or a rear step operation at the accelerator pedal 22 or through operations performed at the accelerator pedal 22 and the forward/backward selector switch 51, these commands may instead be issued via another operating member (e.g., a lever).

While a reverse operation at the accelerator pedal 22 is detected with the pressure switches 41A and 41B or the forward/backward selector switch 51, a reverse operation at the accelerator pedal 22 may be detected with a limit switch or the like instead.

While the solenoid controlled directional control valves 25A and 25B and the like are switched on/off once the motor rotation speed exceeds the reference rotation speed N1 in the embodiments described above, they may instead be switched incrementally in correspondence to the motor rotation speed.

While the self pressure displacement control mechanism of the traveling motor 5 holds the motor displacement at the minimum displacement level over a predetermined relatively low motor drive pressure range, the motor displacement may instead be adjusted in correspondence to the motor drive pressure without setting any such predetermined range.

INDUSTRIAL APPLICABILITY

While an explanation is given above on an example in which the present invention is adopted in a wheel hydraulic excavator, the present invention may also be adopted in other types of hydraulically driven vehicles including construction machines such as wheel loaders and truck cranes.

The invention claimed is:

1. A hydraulically driven vehicle, comprising:
a hydraulic pump driven by an engine;
a variable displacement hydraulic motor for traveling driven by pressure oil from the hydraulic pump;
a motor displacement control device that adjusts a displacement of the hydraulic motor in correspondence to a drive pressure at the hydraulic motor;
an operating motor through which a forward travel command and a backward travel command for the vehicle and a command for acceleration and deceleration for the vehicle are issued;
a pilot valve configured to provide a pilot pressure oil in accordance with an extent to which the operating member is operated;
a control valve configured to be driven by the pilot pressure oil from the pilot valve to control a flow of pressure oil from the hydraulic pump to the hydraulic motor;
a counterbalance valve, that is disposed between the control valve and the hydraulic motor, configured to be switched to an opening position by the pressure oil supplied from the hydraulic pump so as to open a return path for oil to return from the hydraulic motor to the control valve, and to be switched to a closing position so as to close the return path as the pressure oil from the hydraulic pump is stopped;
a directional control valve that controls a flow of the pilot pressure oil which acts on the control valve;
a neutral command device that issues a command for switching the control valve to a neutral position;

a reverse operation detection device that detects a reverse operation of the operating member performed to a reverse side opposite from a direction along which the vehicle is advancing;

a rotation speed detection device that detects a physical quantity having a correlation to a rotation speed of the hydraulic motor; and a control device that stops supply of the pressure oil from the hydraulic pump to the hydraulic motor by interrupting the flow of the pilot pressure oil to the control valve in response to the command issued from the neutral command device, regardless of operation of the operating member, wherein:

when the command is not issued from the neutral command device, the control device (a) stops supply of the pressure oil from the hydraulic pump to the hydraulic motor by interrupting the flow of the pilot pressure oil to the control valve if the physical quantity detected by the rotation speed detection device exceeds a reference value and the reverse operation at the operating member is detected by the reverse operation detection device, and (b) allows the pilot pressure oil to flow to the control valve, even if the reverse operation at the operating member is detected, if the physical quantity detected by the rotation speed detection device is equal to or smaller than the reference value.

2. A hydraulically driven vehicle, comprising:

a hydraulic pump driven by an engine;

a variable displacement hydraulic motor for traveling driven by pressure oil from the hydraulic pump;

a motor displacement control device that adjusts a displacement of the hydraulic motor in correspondence to a drive pressure at the hydraulic motor;

a forward/backward operating member through which a forward travel command, a backward travel command and a neutral command for the vehicle are issued;

a traveling operation member through which a command for acceleration and deceleration for the vehicle is issued in accordance with an extent to which the traveling operation member is operated;

a pilot valve configured to provide a pilot pressure oil in response to an operation of the traveling operation member;

a control valve configured to be driven by the pilot pressure oil from the pilot valve to control a flow of pressure oil from the hydraulic pump to the hydraulic motor;

a counterbalance valve, that is disposed between the control valve and the hydraulic motor, configured to be switched to an opening position by the pressure oil supplied from the hydraulic pump so as to open a return path for oil to return from the hydraulic motor to the control valve, and to be switched to a closing position so as to close the return path as the pressure oil from the hydraulic pump is stopped;

a directional control valve that controls a flow of the pilot pressure oil which acts on the control valve in response to an operation of the forward/backward operating member;

a reverse operation detection device that detects a reverse operation of the forward/backward operating member performed to a reverse side opposite from a direction along which the vehicle is advancing;

a rotation speed detection device that detects a physical quantity having a correlation to a rotation speed of the hydraulic motor; and a control device that stops supply of the pressure oil from the hydraulic pump to the hydraulic motor by interrupting the flow of the pilot pressure oil to the control valve in response to the neutral command issued from the forward/backward operating member, regardless of the operation of the traveling operation member, wherein:

when the neutral command is not issued from the forward/backward operating member, the control device (a) stops supply of the pressure oil from the hydraulic pump to the hydraulic motor by interrupting the flow of the pilot pressure oil to the control valve if the physical quantity detected by the rotation speed detection device exceeds a reference value and the reverse operation at the forward/backward operating member is detected by the reverse operation detection device, and (b) allows the pilot pressure oil to flow to the control valve, even if the reverse operation at the forward/backward operating member is detected, if the physical quantity detected by the rotation speed detection device is equal to or smaller than the reference value.

3. A hydraulically driven vehicle, comprising:

a hydraulic pump driven by an engine;

a variable displacement hydraulic motor for traveling driven by pressure oil from the hydraulic pump;

a motor displacement control device that adjusts a displacement of the hydraulic motor in correspondence to a drive pressure at the hydraulic motor;

an operating member through which a forward travel command and a backward travel command for the vehicle and a command for acceleration and deceleration for the vehicle are issued;

a pilot valve configured to provide a pilot pressure oil in accordance with an extent to which the operating member is operated;

a control valve configured to be driven by the pilot pressure oil from the pilot valve to control a flow of pressure oil from the hydraulic pump to the hydraulic motor;

a counterbalance valve, that is disposed between the control valve and the hydraulic motor, configured to be switched to an opening position by the pressure oil supplied from the hydraulic pump so as to open a return path for oil to return from the hydraulic motor to the control valve, and to be switched to a closing position so as to close the return path as the pressure oil from the hydraulic pump is stopped;

a first directional control valve that is disposed between the control valve and the counterbalance valve and controls a flow of the pressure oil from the hydraulic pump to the hydraulic motor;

a neutral command device that issues a command for switching the control valve to a neutral position;

a second directional control valve configured to be switched to interrupt the pilot pressure oil which acts on the control valve in response to the command issued from the neutral command device, regardless of operation of the operating member, and configured to be switched to allow the pilot pressure to flow to the control valve when the command is not issued from the neutral command device;

a reverse operation detection device that detects a reverse operation of the operating member performed to a reverse side opposite from a direction along which the vehicle is advancing;

a rotation speed detection device that detects a physical quantity having a correlation to a rotation speed of the hydraulic motor; and a control device that controls the first directional control valve such that the first directional control valve (a) stops the flow of the pressure oil from the hydraulic pump to the hydraulic motor when the physical quantity detected by the rotation speed detection device exceeds a reference value and the reverse operation at the operating member is detected by the reverse operation detection device, and (b) allows the pilot pressure oil to flow to the control valve, even if the reverse operation at the operating member is detected, when the physical quantity detected by the rotation speed detection device is equal to or smaller than the reference value.

4. A hydraulically driven vehicle according to claim 1, wherein:
the physical quantity is a vehicle speed and the reference value is set to a smaller value as a gear ratio increases.

5. A hydraulically driven vehicle according to claim 1, further comprising:
an inertial force detection device that detects an inertial force applied to the vehicle, wherein:
the reference value is set to a smaller value as a greater inertial force is detected.

6. A hydraulically driven vehicle according to claim 5, wherein:
the inertial force detection device detects a grade of a road surface and the reference value is set to a smaller value as the grade becomes steeper.

7. A hydraulically driven vehicle according to claim 5, wherein:
the inertial force detection device detects a vehicle weight, and the reference value is set to a smaller value as the vehicle weight becomes greater.

8. A hydraulically driven vehicle according to claim 2, wherein:
the physical quantity is a vehicle speed and the reference value is set to a smaller value as a gear ratio increases.

9. A hydraulically driven vehicle according to claim 2, further comprising:
an inertial force detection device that detects an inertial force applied to the vehicle, wherein:
the reference value is set to a smaller value as a greater inertial force is detected.

10. A hydraulically driven vehicle according to claim 9, wherein:
the inertial force detection device detects a grade of a road surface and the reference value is set to a smaller value as the grade becomes steeper.

11. A hydraulically driven vehicle according to claim 9, wherein:
the inertial force detection device detects a vehicle weight, and the reference value is set to a smaller value as the vehicle weight becomes greater.

12. A hydraulically driven vehicle according to claim 3, wherein:
the physical quantity is a vehicle speed and the reference value is set to a smaller value as a gear ratio increases.

13. A hydraulically driven vehicle according to claim 3, further comprising:
an inertial force detection device that detects an inertial force applied to the vehicle, wherein:
the reference value is set to a smaller value as a greater inertial force is detected.

14. A hydraulically driven vehicle according to claim 13, wherein:
the inertial force detection device detects a grade of a road surface and the reference value is set to a smaller value as the grade becomes steeper.

15. A hydraulically driven vehicle according to claim 13, wherein:
the inertial force detection device detects a vehicle weight, and the reference value is set to a smaller value as the vehicle weight becomes greater.

* * * * *